US010523399B2

(12) United States Patent
Park et al.

(10) Patent No.: US 10,523,399 B2
(45) Date of Patent: Dec. 31, 2019

(54) APPARATUS AND METHOD FOR TRANSMITTING/RECEIVING MULTIMEDIA DATA DELIVERY CHARACTERISTICS INFORMATION IN MULTIMEDIA COMMUNICATION SYSTEM

(71) Applicants: Samsung Electronics Co. Ltd., Suwon-si, Gyeonggi-do (KR); University-Industry Cooperation Group of Kyung Hee University, Yongin-si, Gyeonggi-do (KR)

(72) Inventors: Kyung-Mo Park, Seoul (KR); Doug-Young Suh, Seongnam-si (KR); Sung-Ryeul Rhyu, Yongin-si (KR); Sung-Oh Hwang, Yongin-si (KR); Yong-Hun Lee, Suwon-si (KR); Jae-Yeon Song, Seoul (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 14/052,229

(22) Filed: Oct. 11, 2013

(65) Prior Publication Data

US 2014/0105132 A1   Apr. 17, 2014

(30) Foreign Application Priority Data

Oct. 11, 2012 (KR) .......................... 10-2012-0113109
Oct. 16, 2012 (KR) .......................... 10-2012-0114853

(51) Int. Cl.
*H04L 5/00*       (2006.01)
*H04L 12/863*     (2013.01)

(52) U.S. Cl.
CPC .............. *H04L 5/006* (2013.01); *H04L 47/54* (2013.01)

(58) Field of Classification Search
CPC ................................ H04L 12/26; H04L 47/23
See application file for complete search history.

(56) References Cited

U.S. PATENT DOCUMENTS 5,461,611 A * 10/1995 Drake, Jr. ............... H04L 47/10
                                                      370/420
2005/0047345 A1   3/2005 Suh
(Continued)

FOREIGN PATENT DOCUMENTS

CN     1863313 A    11/2006
CN   101127605 A     2/2008
(Continued)

OTHER PUBLICATIONS

Lee , MMT: Proposed modifications to MFU and MPU, ISO/IEC JTC1/SC29/WG11, MPEG2012/M25956, , Stockholm, Sweden, Jul. 2012.*
(Continued)

*Primary Examiner* — Zhensheng Zhang
(74) *Attorney, Agent, or Firm* — Jefferson IP Law, LLP (57) ABSTRACT

A method for transmitting multimedia data delivery characteristics information by a multimedia data transmission apparatus in a multimedia communication system is provided. The method includes transmitting, to a multimedia data reception apparatus, an element indicating whether multimedia data delivery characteristics information denoting information related to a Quality of Service (QoS) for multimedia data is included, and the multimedia data delivery characteristics information if the element indicates that the multimedia data delivery characteristics information is included.

3 Claims, 3 Drawing Sheets

(56) References Cited

U.S. PATENT DOCUMENTS

| | | |
|---|---|---|
| 2005/0094611 A1 | 5/2005 | Cheong et al. |
| 2006/0126547 A1 | 6/2006 | Puuskari et al. |
| 2007/0217340 A1 | 9/2007 | Nakamichi et al. |
| 2008/0192646 A1 | 8/2008 | Song et al. |
| 2008/0192763 A1 | 8/2008 | Davis et al. |
| 2010/0296474 A1 | 11/2010 | Noriega |
| 2012/0005365 A1 | 1/2012 | Ma et al. |
| 2012/0155282 A1 | 6/2012 | Dorenbosch |
| 2012/0185907 A1 | 7/2012 | Park et al. |

FOREIGN PATENT DOCUMENTS

| | | |
|---|---|---|
| CN | 100418380 C | 9/2008 |
| EP | 1 936 868 A1 | 6/2008 |
| JP | 2007-251792 A | 9/2007 |
| WO | 2012-099429 A2 | 7/2012 |

OTHER PUBLICATIONS

Information technology—High efficiency coding and media delivery in heterogeneous environments—Part 1: MPEG media transport (MMT), ISO/IEC CD 23008-1, STD Version 2.1c2, ISO/IEC JTC 1/SC 29 N, Jul. 20, 2012.

"A Wireless MAC Scheduler Based on Video Traces for Cross-Layer Optimization", Trans KIEE. vol. 55D, No. 5, pp. 236-239, Apr. 16, 2006.

\* cited by examiner

APPARATUS AND METHOD FOR TRANSMITTING/RECEIVING MULTIMEDIA DATA DELIVERY CHARACTERISTICS INFORMATION IN MULTIMEDIA COMMUNICATION SYSTEM

CROSS-REFERENCE TO RELATED APPLICATION(S)

This application claims the benefit under 35 U.S.C. § 119(a) of a Korean patent application filed on Oct. 11, 2012 in the Korean Intellectual Property Office and assigned Serial No. 10-2012-0113109 and, under 35 U.S.C. § 119(a) of a Korean patent application filed on Oct. 16, 2012 in the Korean Intellectual Property Office and assigned Serial No. 10-2012-0114853, the entire disclosure of which is hereby incorporated by reference.

TECHNICAL FIELD

The present disclosure relates to an apparatus and method for transmitting/receiving multimedia data delivery characteristics information in a multimedia communication system.

BACKGROUND

Recently, a multimedia communication system which provides a multimedia service has been actively researched. The multimedia service includes a conversational service such as a video phone, a streaming service such as a Video On Demand (VOD) service, a service such as a multicast multimedia service and a broadcast multimedia service. The multimedia service may be classified into a real time multimedia service and a non real time multimedia service, and the real time multimedia service may be classified into the conversational service, an interactive service, the streaming service, etc. according to a service type. Further, the multimedia service may be classified into a unicast multimedia service, the multicast multimedia service, and the broadcast multimedia service according to the number of User Equipments (UEs) which receive the multimedia service.

In an Institute of Electrical and Electronics Engineers (IEEE) 802.16 standard, e.g., an IEEE 802.16 based Worldwide Interoperability for Microwave Access (WIMAX) standard, an IEEE 802.11e standard, e.g., an IEEE 802.11e based Wireless Fidelity Transmission Opportunity (WiFi TXOP) standard, and an Universal Mobile Telecommunications System (UMTS) standard and a Long Term Evolution (LTE) standard of the 3rd Generation Partnership Project (3GPP), a function of reserving a resource for providing a multimedia service and guaranteeing the reserved resource has been proposed.

The multimedia communication system may use the following resource reservation protocols in order to guarantee a Quality of Service (QoS) of a real time multimedia service.

In the resource reservation protocols such as a traffic specification (tspec), a request specification (rspec), and a flow specification (flowspec) included in a Resource Reservation Protocol (RSVP) as a resource reservation protocol used in an Internet Engineering Task Force (IETF), various parameters are defined, and the various parameters have a compatibility with the IEEE 802.16 standard, the IEEE 802.11e standard, the UMTS standard and the LTE standard of 3GPP.

In the IEEE 802.16 standard, the IEEE 802.11e standard, the UMTS standard and the LTE standard of 3GPP, a resource is generally reserved using a double leaky bucket parameter.

Figure 1:
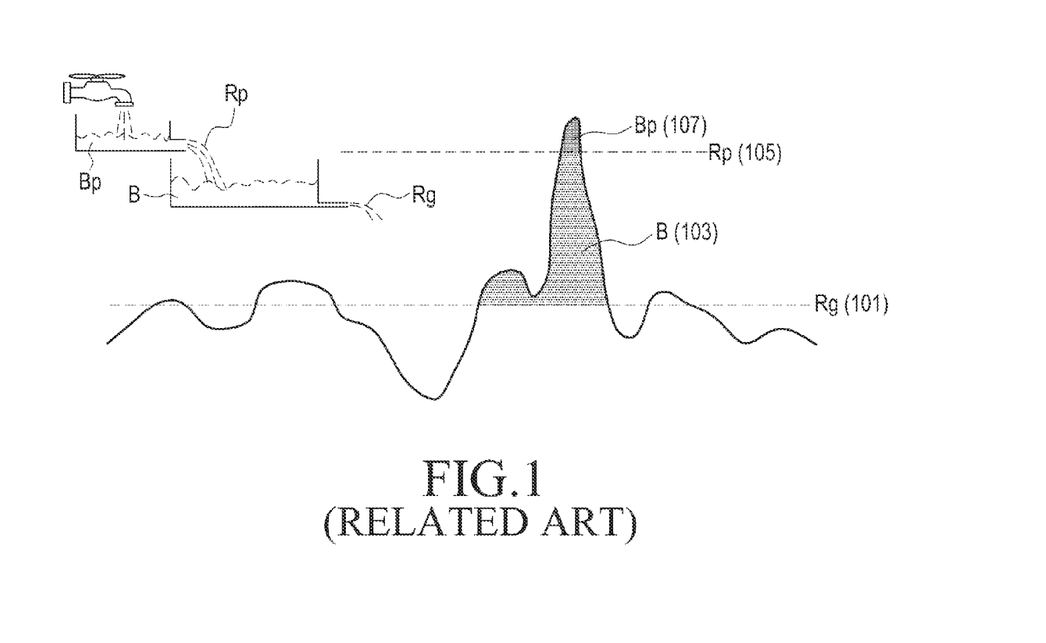
FIG. 1 schematically illustrates a process for expressing data with a variable bit rate using a double leaky bucket parameter in a multimedia communication system according to the related art.

FIG. 1 schematically illustrates a process for expressing data with a variable bit rate using a double leaky bucket parameter in a multimedia communication system according to the related art.

Referring to FIG. 1, a traffic with a variable bit rate is expressed in a form of double leaky bucket using four parameters (Rg, Rp, Bp, B) included in a tspec of a RSVP. Here, Rg is a parameter denoting a guaranteed bit rate, Rp is a parameter denoting a peak bit rate, Bp is a parameter denoting a buffer size for the peak bit rate, and B is a parameter denoting a buffer size.

In FIG. 1, a guaranteed bit rate Rg 101 denotes a given average bit rate, an overflow does not occur if related bits are stored in a buffer at a related timing point even though a bit rate at the related timing point is momentarily greater than the guaranteed bit rate Rg 101. In FIG. 1, it will be assumed that a buffer size necessary for the guaranteed bit rate Rg 101 is B 103. In some cases, the buffer size B 103 corresponds to the guaranteed bit rate Rg 101, and may be expressed as a guaranteed buffer size Bg.

Further, a peak bit rate Rp 105 may be previously determined. If it is assumed that the peak bit rate Rp 105 is maintained within a period in which one data packet is transmitted, a buffer size Bp 107 for the peak bit rate Rp 105 may be determined as a maximum size for a Service Data Unit (SDU). The maximum size for the SDU may be generally expressed using a Maximum Transfer Unit (MTU).

An example of various protocols using four double leaky bucket parameters is expressed in Table 1.

TABLE 1

|    | IETF RSVP, IEEE 802.11e 'tspec' | IEEE 802.16 (WIMAX) | 3GPP UMTS & LTE | MPEG-4 OD | ATM |
| --- | --- | --- | --- | --- | --- |
| Rp | p | Min. reserved traffic rate | Maximum bit rate (4B) | avgBitrate | PCR |
| Bp | M | SDU size | Maximum SDU size | MAX_AU_SIZE | CDVT |
| Rg | R | Max. sustained traffic rate | Guaranteed bit rate (4B) | AverageBitRate | SCR |
| Bg | b | Maximum Latency | k* Maximum SDU | bufferSizeDB | BT |

As expressed in Table 1, p, M, r, b corresponding to Rg, Rp, Bp, B are used in an IETF RSVP and an IEEE 802.11e tspec, Minimum reserved traffic rate, SDU size, Maximum sustained traffic rate, Maximum Latency corresponding to Rg, Rp, Bp, B are used in an IEEE 802.16 based WIMAX standard, Maximum bit rate (4B), Maximum SDU size, Guaranteed bit rate (4B), k* Maximum SDU corresponding to Rg, Rp, Bp, B are used in a 3GPP UMTS & LTE standard, avgBitrate, MAX_AU_SIZE, AverageBitRate, bufferSizeDB corresponding to Rg, Rp, Bp, B are used in a Moving Picture Expert Group (MPEG)-4 Object Descriptors (OD) standard, and PCR, CDVT, SCR, BT corresponding to Rg, Rp, Bp, B are used in an Asynchronous Transfer Mode (ATM) standard.

A detailed description of p, M, r, b used in the IETF RSVP and the IEEE 802.11e tspec, Minimum reserved traffic rate, SDU size, Maximum sustained traffic rate, Maximum Latency used in the IEEE 802.16 based WIMAX standard, Maximum bitrate (4B), Maximum SDU size, Guaranteed bitrate (4B), k*Maximum SDU used in the 3GPP UMTS & LTE standard, avgBitrate, MAX_AU_SIZE, AverageBitRate, bufferSizeDB used in the MPEG-4 OD standard, and PCR, CDVT, SCR, BT used in the ATM standard will be omitted herein.

As expressed in Table 1, it is advantageous in view of compatibility with other protocols to generate multimedia data delivery characteristics information using the double leaky bucket parameters.

Generally, a resource reservation protocol is set up in a service session establishment process for providing a multimedia service. It is assumed that the resource reservation protocol is set up while the multimedia service is performed, that is, the resource reservation protocol is set up among end points on a network which transmits data for all of multimedia contents.

However, it is impossible to reserve a resource among end points which are provided a service in an open internet environment of the related art. In a core network, a stable and wideband transmission is possible, however, a problem due to resource sharing among a plurality of UEs may occur at a closer point to end points. Specially, in a wireless communication and a mobile communication system, network environment dynamically changes due to various reasons such as movement of a UE, electronic interference, etc. For convenience in explanation, the network environment which dynamically changes will be referred to as a 'dynamic network environment'.

Figure 2:
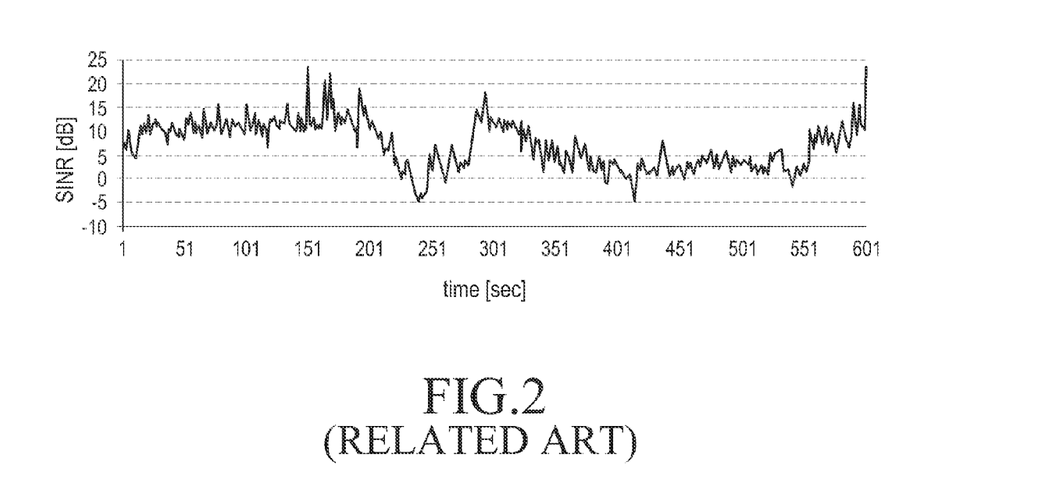
FIG. 2 schematically illustrates a change of dynamic network environment in a mobile network of a communication system according to the related art.

FIG. 2 schematically illustrates a change of dynamic network environment in a mobile network of a communication system according to the related art.

Referring to FIG. 2, for example, the mobile network may be an IEEE 802.16 network using an IEEE 802.16 standard. In a graph in FIG. 2, a horizontal axis indicates time, and a vertical axis indicates a Signal to Interference plus Noise Ratio (SINR)(dB) measured at related time. That is, the graph in FIG. 2 indicates SINRs which have been measured during 10 minutes.

Meanwhile, in a related-art MPEG standard, a MPEG Media Transport (MMT) technology has been standardized. In the MMT technology, a function of reserving a resource for a multimedia service and guaranteeing the reserved resource, a function of generating multimedia data delivery characteristics information in dynamic network environment and transmitting/receiving the generated multimedia data delivery characteristics information, etc. have been studied.

In the MMT technology, an MMT asset unit of delivery characteristics information is provided using Asset Delivery Characteristics (ADC) information.

The MMT asset includes one or more Media Processing Units (MPUs). The MPU is packetized into one or more MMT payloads according to a size. That is, the MPU may be packetized into one MMT payload according to a Maximum Transport Unit (MTU) size, or packetized into a plurality of MMT payloads by fragmenting the MPU, or packetized into one MMT payload including a plurality of MPUs by aggregating the MPU. The MMT asset is the largest data unit to which composition information and delivery characteristics are applied.

The ADC information is information for guaranteeing a QoS of the MMT asset delivery, and denotes a medium parameter for specific transmission environment and a medium parameter for guaranteeing the QoS.

So, in the MMT system using the MMT technology, a service provider should establish a network by considering the multimedia data delivery characteristics information using the ADC information.

In the dynamic network environment, it becomes difficult to guarantee a reserved resource if a resource is reserved at a service session start timing point using a related-art protocol such as a RSVP. Due to mobile environment characteristics, a Base Station (BS) which provides a service to a UE changes if the UE moves, so there is a need for a new resource reservation process. Therefore, there is a need for guaranteeing a QoS of a multimedia service in dynamic network environment.

If the resource is reserved at the service session start timing point even though a data rate variously changes according to multimedia data delivery characteristics, a resource guaranteed according to the resource reservation may not be used. Further, it is difficult to share the non-used resource with other UEs. So, there is a need for dynamically reserving/allocating a resource according to dynamic multimedia data delivery characteristics.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting/receiving multimedia data delivery characteristics information in a multimedia communication system.

An aspect of the present disclosure proposes an apparatus and method for transmitting/receiving multimedia data delivery characteristics information by considering dynamic network environment in a multimedia communication system.

An aspect of the present disclosure proposes an apparatus and method for transmitting/receiving multimedia data delivery characteristics information on a preset multimedia data unit basis by considering dynamic network environment in a multimedia communication system.

In accordance with an aspect of the present disclosure, a method for transmitting multimedia data delivery characteristics information by a multimedia data transmission apparatus in a multimedia communication system is provided. The method includes transmitting, to a multimedia data reception apparatus, an element indicating whether multimedia data delivery characteristics information denoting information related to a Quality of Service (QoS) for multimedia data is included, and the multimedia data delivery characteristics information if the element indicates that the multimedia data delivery characteristics information is included, wherein the multimedia data delivery characteristics information includes an element denoting transmission packet loss characteristics for the multimedia data, an element denoting a delay sensitivity characteristics for the multimedia data, an element indicating characteristics for the multimedia data with a bit stream characteristic, an element denoting a minimum bit rate which should be guaranteed for continuous delivery of the multimedia data, an element denoting a maximum buffer size for delivery of the multimedia data, an element denoting a peak bit rate during the continuous delivery of the multimedia data, an element denoting a minimum period of other multimedia data different from the multimedia data during the continuous delivery of the multimedia data, and an element denoting a maximum size of the other multimedia data.

In accordance with another aspect of the present disclosure, a method for receiving multimedia data delivery characteristics information by a multimedia data reception apparatus in a multimedia communication system is provided.

The method includes receiving, from a multimedia data transmission apparatus, an element indicating whether multimedia data delivery characteristics information denoting information related to a QoS for multimedia data is included, and the multimedia data delivery characteristics information if the element indicates that the multimedia data delivery characteristics information is included, wherein the multimedia data delivery characteristics information includes an element denoting transmission packet loss characteristics for the multimedia data, an element denoting a delay sensitivity characteristics for the multimedia data, an element indicating characteristics for the multimedia data with a bit stream characteristic, an element denoting a minimum bit rate which should be guaranteed for continuous delivery of the multimedia data, an element denoting a maximum buffer size for delivery of the multimedia data, an element denoting a peak bit rate during the continuous delivery of the multimedia data, an element denoting a minimum period of other multimedia data different from the multimedia data during the continuous delivery of the multimedia data, and an element denoting a maximum size of the other multimedia data.

In accordance with another aspect of the present disclosure, an apparatus for transmitting multimedia data delivery characteristics information in a multimedia communication system is provided. The apparatus includes a transmitter configured to transmit, to a multimedia data reception apparatus, an element indicating whether multimedia data delivery characteristics information denoting information related to a QoS for multimedia data is included, and the multimedia data delivery characteristics information if the element indicates that the multimedia data delivery characteristics information is included, wherein the multimedia data delivery characteristics information includes an element denoting transmission packet loss characteristics for the multimedia data, an element denoting a delay sensitivity characteristics for the multimedia data, an element indicating characteristics for the multimedia data with a bit stream characteristic, an element denoting a minimum bit rate which should be guaranteed for continuous delivery of the multimedia data, an element denoting a maximum buffer size for delivery of the multimedia data, an element denoting a peak bit rate during the continuous delivery of the multimedia data, an element denoting a minimum period of other multimedia data different from the multimedia data during the continuous delivery of the multimedia data, and an element denoting a maximum size of the other multimedia data.

In accordance with another aspect of the present disclosure, an apparatus for receiving multimedia data delivery characteristics information in a multimedia communication system is provided. The apparatus includes a receiver configured to receive, from a multimedia data transmission apparatus, an element indicating whether multimedia data delivery characteristics information denoting information related to a QoS for multimedia data is included, and the multimedia data delivery characteristics information if the element indicates that the multimedia data delivery characteristics information is included, wherein the multimedia data delivery characteristics information includes an element denoting transmission packet loss characteristics for the multimedia data, an element denoting a delay sensitivity characteristics for the multimedia data, an element indicating characteristics for the multimedia data with a bit stream characteristic, an element denoting a minimum bit rate which should be guaranteed for continuous delivery of the multimedia data, an element denoting a maximum buffer size for delivery of the multimedia data, an element denoting a peak bit rate during the continuous delivery of the multimedia data, an element denoting a minimum period of other multimedia data different from the multimedia data during the continuous delivery of the multimedia data, and an element denoting a maximum size of the other multimedia data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An embodiment of the present disclosure proposes an apparatus and method for transmitting/receiving multimedia data delivery characteristics information in a multimedia communication system.

An embodiment of the present disclosure proposes an apparatus and method for transmitting/receiving multimedia data delivery characteristics information by considering dynamic network environment in a multimedia communication system.

An embodiment of the present disclosure proposes an apparatus and method for transmitting/receiving multimedia data delivery characteristics information on a preset multimedia data unit basis by considering dynamic network environment in a multimedia communication system.

An apparatus and method for transmitting/receiving multimedia data delivery characteristics information proposed in an embodiment of the present disclosure will be described with reference to a Moving Picture Expert Group (MPEG) Media Transport (MMT) system. Further, an apparatus and method proposed in an embodiment of the present disclosure may be applied to various communication systems such as a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, and an Institute of Electrical and Electronics Engineers (IEEE) mobile communication system. That is, an apparatus and method proposed in an embodiment of the present disclosure may be applied to all multimedia systems which may provide a multimedia service.

In a wireless communication network and a mobile communication network, a network environment dynamically changes due to various reasons such as movement of a User Equipment (UE), electronic interference, etc. In this case, if a resource is reserved in order to guarantee a Quality of Service (QoS) of a multimedia service, it is far more effective to reserve a resource for a relatively short unit or a preset period unit of multimedia contents compared to total multimedia contents.

Therefore, an embodiment of the present disclosure proposes an apparatus and method for transmitting/receiving Media Processing Unit (MPU) Delivery Characteristics (MDC) information as sub-information used for managing a QoS of the MPU in order to reserve a resource on a MPU unit basis or a preset period basis. Here, the MPU is a unit used for generating multimedia contents. For example, the preset period may be an MMT asset or an MMT subasset. The MMT asset includes one or more than there are MPUs. The MMT asset includes one or more than there are MMT subassets. The MMT subasset denotes a unit which is generated by dividing the MMT asset into one or more than periods according to a media bit rate characteristic for an effective resource reservation. In an embodiment of the present disclosure, the MDC information is transmitted in an MDC header, a description of the MDC information and a method for inserting the MDC information into the MPU header is provided below.

The sub-information used for reserving a transmission resource by the MPU (or a relatively small time unit and a preset period of multimedia data, e.g., an MMT asset, an MMT subasset or Group of Picture (GOP)) unit basis and managing a QoS, i.e., MDC information is delivery characteristics information on an MPU unit or a preset period of multimedia data, e.g., an MMT asset or an MMT subasset. A syntax for specifying the MDC information will be described below with reference to Table 2.

An MPU header syntax is expressed in Table 2, and the MDC information according to an embodiment of the present disclosure is expressed in bold in the following MPU header syntax.

As described above, in Table 2, a name and a size of each element or attribute, a kind of values which are used for expressing each element or attribute are selected by a function proposed in an embodiment of the present disclosure, and may be varied according to a user or an operator's intention, or a precedent. However, it will be understood by those of ordinary skill in the art that a meaning of each element or attribute should follow a meaning provided in this document.

TABLE 2

| Syntax |
| --- |
| MPU_Header( ){<br>  mpu_length;<br>  header_length;<br>  mpu_sequence_number;<br>  number_of_au;<br>  for(int i=0; i<number_of_au; i++){<br>    au_length;<br>  }<br>  private_header_flag;<br>  if(private_header_flag == 1){<br>    private_header_length<br>    private_header<br>  } |

TABLE 2-continued

Syntax

```
MPU_delivery_characteristic_header_flag;
if(MPU_delivery_characteristic_header_flag== 1){
    QoS_descriptor( ){
        loss_priority;
        delay_priority;
        class_of_service;
        hybrid_sync_indicator;
    }
    Bitstream_descriptor( ){
        sustainable_rate;
        buffer_size;
        peak_rate;
        max_MFU_size;
        MFU_perid;
    }
```

TABLE 2-continued

Syntax

```
    }
}
MPU_Payload( )
```

Semantics of each element or attribute included in the MPU header syntax in Table 2 will be described below with reference to Table 3.

Each element or attribute name and definition included in the MPU header syntax in Table 2 are expressed in Table 3, and each element or attribute name and definition corresponding to the MDC information are expressed in bold. For convenience, an element or attribute will be referred to as an 'element'.

TABLE 3

| Element or Attribute Name | Description |
| --- | --- |
| mpu_sequence_number | Specifies a sequence number of an MPU in a single MMT Asset. It is incremented by 1 and will be unique within in an MMT Asset. |
| number_of_au | Specifies the number of Access Units (AUs) in this MPU. |
| au_length | Specifies a length of each AU in this MPU. |
| private_header_flag | Indicates that there is a private_header. |
| private_header_length | Specifies the length of the private_header. |
| MPU_delivery_characteristic_header_flag | Indicates whether there is MDC information in a related MPU header. |
| loss_priority | Denotes transmission packet loss characteristics for this MPU.<br>11: loss priority 0 (Lossless)<br>10: loss priority 1 (Lossy, High priority)<br>01: loss priority 2 (Lossy, Medium priority)<br>00: loss priority 3 (Lossy, Low priority) |
| delay_priority | Denotes delay sensitivity characteristics for this MPU.<br>11: high sensitivity: end-to-end delay <<1 sec (e.g., VoIP, video-conference)<br>10: medium sensitivity: end-to-end delay approx. 1 sec (e.g., live-streaming)<br>01: low sensitivity: end-to-end delay <5~10 sec (e.g., VoD)<br>00: don't care (e.g., FTP, file download) |
| class_of_service | Indicates characteristics for this MPU with a bit stream characteristic.<br>111: The Constant Bit Rate (CBR) service class shall guarantee peak bitrate at any time to be dedicated for transmission of the MPU. This class is appropriate for real time services which use a fixed bitrate such as Voice over Internet Protocol (VoIP) without silence suppression.<br>110: The real-time Variable Bit Rate (rt-VBR) service class shall guarantee a sustainable bitrate and allow a peak bitrate for the MPU with delay constraints over shared channel. This class is appropriate for most real time services such as video telephony, videoconferencing, streaming service, etc.<br>101: The non-real-time Variable Bit Rate (nrt-VBR) service class shall guarantee sustainable bitrate and allow peak bitrate for the MPU without delay constraint over shared channel such as file downloading.<br>100: The Available Bit Rate (ABR) class shall not guarantee any bitrate, but may report available bitrate for feedback control. This class is appropriate for applications which can be adaptive to time-varying bitrate such as video streaming with RTCP feedback.<br>011: The Unspecified Bit Rate (UBR) class shall not guarantee any bitrate and shall not indicate congestion. This class is appropriate for |

TABLE 3-continued

| Element or Attribute Name | Description |
| --- | --- |
| | interactive applications such as Web browsing. A UBR service is equivalent to the term "best effort service". |
| hybrid_sync_indicator | Is for transmission synchronization between this MPU and another MPU.<br>1: no dependency.<br>0: dependent on the other MPU for synchronization in hybrid delivery. |
| sustainable_rate | The sustainable_rate defines the minimum bitrate that shall be guaranteed for continuous delivery of the MPU. The sustainable_rate corresponds to drain rate in token bucket model. The sustainable_rate is expressed in kilobits of MFU(or MPU) per second. |
| buffer_size | The buffer_size defines the maximum buffer size for delivery of the MPU. The buffer absorbs excess instantaneous bitrate higher than the sustainable_rate and the buffer_size shall be large enough to avoid overflow. The buffer_size corresponds to bucket depth in token bucket model. Buffer_size of a CBR MPU shall be zero. The buffer_size is expressed in kilobits. |
| peak_rate | The peak_rate defines peak bitrate during continuous delivery of the MPU. The peak_rate is the highest average bit rate during every MFU period. The peak_rate is expressed in kilobits of MFU (or MPU) per second. |
| MFU_period | The MFU period defines minimum period of MFU during continuous delivery of the MPU. The MFU period is expressed in milliseconds. |
| max_MFU_size | The max_MFU_size is the maximum size of MFU, which is MFU_period*peak_rate. The max_MFU_size is expressed in kilobits. |
| SubAsset_period | Temporal length of a sub-asset. The SubAssetPeriod is expressed in seconds. |

In Table 3, the mpu_sequence_number is an element denoting the number of MPUs included in a single MMT asset, and a value of the mpu_sequence_number increases by a preset value, e.g., '1', and will be unique in an MMT asset.

In Table 3, the number_of_au is an element denoting the number of Access Units (Ails) included in a related MPU.

In Table 3, the au_length is an element denoting a length of the AUs included in the related MPU.

In Table 3, the private_header_flag is an element indicating that there is a private header.

In Table 3, the private_header_length is an element denoting a length of the private header.

In Table 3, the MPU_delivery_characteristic_header_flag is an element indicating whether there is MDC information in a related MPU header. The MPU_delivery_characteristic_header_flag may be implemented with 1 bit. For example, if a value of the MPU_delivery_characteristic_header_flag is '1', the MPU_delivery_characteristic_header_flag indicates that there is the MDC information in the related MPU header.

In Table 3, the loss_priority is an element denoting transmission packet loss characteristics for the related MPU, i.e., a loss_priority. The loss_priority may be implemented with 2 bits. For example, if a value of the loss_priority is '11', the loss_priority indicates a loss_priority 0, if a value of the loss_priority is '10', the loss_priority indicates a loss_priority 1, if a value of the loss_priority is '01', the loss_priority indicates a loss_priority 2, and if a value of the loss_priority is '00', the loss_priority indicates a loss_priority 3. The loss_priority 0 indicates that transmission packet loss for the related MPU does not occur (e.g., Lossless), the loss_priority 1 indicates that the transmission packet loss for the related MPU occurs and has a high priority (e.g., Lossy, High priority), the loss_priority 2 indicates that the transmission packet loss for the related MPU occurs and has a medium priority (e.g., Lossy, Medium priority), and the loss_priority 3 indicates that the transmission packet loss for the related MPU occurs and has a low priority (e.g., Lossy, Low priority). The high priority denotes a priority higher than a first priority, the medium priority denotes a priority lower than or equal to the first priority and higher than a second priority, and the low priority denotes a priority lower than the second priority.

In Table 3, the delay_priority is an element denoting delay sensitivity characteristics for the related MPU. For example, the delay_priority may be implemented with 2 bits. For example, if a value of the delay_priority is '11', the delay_priority indicates that the related MPU has a high delay sensitivity (e.g., high sensitivity), if a value of the delay_priority is '10', the delay_priority indicates that the related MPU has a medium delay sensitivity (e.g., medium sensitivity), if a value of the delay_priority is '01', the delay_priority indicates that the related MPU has a low delay sensitivity (e.g., low sensitivity), and if a value of the delay_priority is '00', the delay_priority indicates that the related MPU does not care about a delay sensitivity (e.g., don't care). The high delay sensitivity indicates delay time for the related MPU is shorter than first delay time, the medium delay sensitivity indicates the delay time for the related MPU is equal to or longer than the first delay time and shorter than second delay time, and the low delay sensitivity indicates the delay time for the related MPU is equal to or longer than the second delay time.

For example, the high sensitivity indicates that end-to-end delay is far less than 1 sec. Here, the multimedia service such as a Voice over Internet Protocol (VoIP) and a videoconference may have high sensitivity characteristics. For example, the medium sensitivity indicates that the end-to-end delay is about 1 sec. Here, a multimedia service such as live-streaming may have medium sensitivity characteristics. For example, the low sensitivity indicates that the end-to-end delay is less than 5~10 secs. Here, a multimedia service such as Video on Demand (VoD) may have low sensitivity characteristics. For example, a multimedia service such as a File Transfer Protocol (FTP) and file download which does not care delay may have don't care characteristics.

In Table 3, the class_of_service is an element indicating characteristics for the MPU with a bit stream characteristic. For example, the class_of_service may be expressed with 3 bits. For example, if a value of the class_of_service is '111', the class_of_service indicates that a Constant Bit Rate (CBR) service class should guarantee a peak bit rate at any time to be dedicated for transmission of the related MPU. The CBR service class is appropriate for real time services which require a fixed bit rate such as VoIP without silence suppression. For example, if a value of the class_of_service is '110', the class_of_service indicates that a Real-Time Variable Bit Rate (rt-VBR) service class should guarantee a sustainable bit rate and allow a peak bit rate for the related MPU with delay constraints over a shared channel. The rt-VBR service class is appropriate for most real time services such as video telephony, video conferencing, a streaming service, etc. For example, if a value of the class_of_service is '101', the class_of_service indicates that a Non-Real-Time Variable Bit Rate (nrt-VBR) service class should guarantee the sustainable bit rate and allow the peak bit rate for the related MPU without a delay constraint over the shared channel such as file downloading. For example, if a value of the class_of_service is '100', the class_of_service indicates that an Available Bit Rate (ABR) class should not guarantee any bit rate, but may report an available bit rate for feedback control. The ABR class is appropriate for applications which can be adaptive to a time-varying bit rate such as video streaming with Real Time Transport Control Protocol (RTCP) feedback. For example, if a value of the class_of_service is '011', the class_of_service indicates that a Unspecified Bit Rate (UBR) class should not guarantee any bit rate and should not indicate congestion. The UBR class is appropriate for interactive applications such as Web browsing. The UBR service is equivalent to the term "best effort service".

In Table 3, the hybrid_sync_indicator is an element for transmission synchronization between the related MPU and the other MPU. For example, the hybrid_sync_indicator may be implemented with 1 bit. For example, if a value of the hybrid_sync_indicator is '1', the hybrid_sync_indicator indicates that it is unnecessary to consider the transmission synchronization between the related MPU and the other MPU (1: no dependency). For example, if a value of the hybrid_sync_indicator is '0', the hybrid_sync_indicator indicates that it is necessary to considering the transmission synchronization between the related MPU and the other MPU (0: dependent on the other MPU for synchronization in hybrid delivery).

In Table 3, the sustainable_rate is an element denoting a minimum bit rate which should be guaranteed for continuous delivery of the related MPU. The sustainable_rate corresponds to a drain rate in a token bucket model. The sustainable_rate is expressed in kilobits of a Media Fragment Unit (MFU) (or an MPU) per second.

In Table 3, the buffer_size is an element denoting a maximum buffer size for delivery of the related MPU. Here, a buffer absorbs an excess instantaneous bit rate higher than the sustainable_rate and the buffer_size shall be large enough to avoid an overflow. The buffer_size corresponds to a bucket depth in a token bucket model. Buffer size of a CBR MPU shall be zero. The buffer_size is expressed in kilobits.

In Table 3, the peak_rate is an element denoting a peak bit rate during the continuous delivery of the related MPU. The peak_rate is the highest average bit rate during every MFU period. The peak_rate is expressed in kilobits of an MFU (or an MPU) per second.

In Table 3, the MFU_period is an element denoting a minimum period of the MFU during the continuous delivery of the related MPU. The MFU period is expressed in milliseconds.

In Table 3, the max_MFU_size is an element denoting a maximum size of the MFU. Here, the max_MFU_size is MFU_period*peak_rate. The max_MFU_size is expressed in kilobits.

In Table 3, the SubAsset_period is an element denoting a temporary length of an MMT Subasset. The SubAssetPeriod is expressed in seconds.

In an embodiment of the present disclosure, in order to reserve a resource at preset periods by considering characteristic for dynamic multimedia data, SubAsset Delivery Characteristics (SubADC) information as sub-information used for managing a QoS of a preset period of MPUs and a method for inserting the SubADC information into the MPU header will be described. The SubADC information denotes delivery characteristics information on the dynamic multimedia data. A syntax for specifying the SubADC information will be described with reference to Table 4.

An MPU header syntax is expressed in Table 4, and information which is added for the SubADC information according to an embodiment of the present disclosure is expressed in bold in the following MPU header syntax.

In Table 4, a name and a size of each element or attribute, a kind of values which are used for expressing each element or attribute are selected by a function proposed in an embodiment of the present disclosure, and may be varied according to a user or an operator's intention, or a precedent. However, it will be understood by those of ordinary skill in the art that a meaning of each element or attribute should follow a meaning provided in the present disclosure.

TABLE 4

| Syntax |
| --- |
| MPU_Header( ){<br>  mpu_length;<br>  header_length;<br>  mpu_sequence_number;<br>  number_of_au;<br>  for(int i=0; i<number_of_au; i++){<br>    au_length;<br>  }<br>  private_header_flag;<br>  if(private_header_flag == 1){<br>    private_header_length<br>    private_header<br>  }<br>  SubAsset_delivery_characteristic_header_flag;<br>  if(SubAsset_delivery_characteristic_header_flag== 1){<br>    QoS_descriptor( ){<br>      loss_priority;<br>      delay_priority;<br>      class_of_service;<br>      hybrid_sync_indicator;<br>    }<br>    Bitstream_descriptor( ){<br>      sustainable_rate; |

TABLE 4-continued

| Syntax |
|---|
|         buffer_size;<br>        peak_rate;<br>        max_MFU_size;<br>        MFU_perid;<br>      SubAsset_period<br>      }<br>    }<br>  }<br>MPU_Payload( ) |

The meaning of each element or attribute which is additionally included in the MPU header syntax in Table 4 will be described in Table 5. The meaning of each element or attribute except for SubAsset_delivery_characteristic_header_flag is described above with reference to Table 3, so a detailed description thereof will be omitted below. In Table 5, the element or attribute name and definition corresponding to information on a preset period for the SubADC information are expressed in bold. For convenience, an element or attribute will be referred to as an 'element'.

TABLE 5

| Element or Attribute Name | Description |
|---|---|
| mpu_sequence_number | Specifies a sequence number of an MPU in a single MMT Asset. It is incremented by 1 and will be unique within an MMT Asset. |
| number_of_au | Specifies the number of AUs in this MPU. |
| au_length | Specifies a length of each AU in this MPU. |
| private_header_flag | Indicates that there is a private_header. |
| private_header_length | Specifies the length of the private_header. |
| SubAsset_delivery_characteristic_header_flag | Indicates whether there is SubADC information. |
| loss_priority | Denotes transmission packet loss characteristics for this MPU.<br>11: loss priority 0 (Lossless)<br>10: loss priority 1 (Lossy, High priority)<br>01: loss priority 2 (Lossy, Medium priority)<br>00: loss priority 3 (Lossy, Low priority) |
| delay_priority | Denotes delay sensitivity characteristics for this MPU.<br>11: high sensitivity: end-to-end delay <<1 sec (e.g., VoIP, video-conference)<br>10: medium sensitivity: end-to-end delay approx. 1 sec (e.g., live-streaming)<br>01: low sensitivity: end-to-end delay <5~10 sec (e.g., VoD)<br>00: don't care (e.g., FTP, file download) |
| class_of_service | Indicates characteristics for this MPU with a bit stream characteristic.<br>111: The Constant Bit Rate (CBR) service class shall guarantee peak bitrate at any time to be dedicated for transmission of the MPU. This class is appropriate for real time services which use a fixed bitrate such as VoIP without silence suppression.<br>110: The Real-Time Variable Bit Rate (rt-VBR) service class shall guarantee a sustainable bitrate and allow a peak bitrate for the MPU with delay constraints over a shared channel. This class is appropriate for most real time services such as video telephony, videoconferencing, streaming service, etc.<br>101: The Non-Real-Time Variable Bit Rate (nrt-VBR) service class shall guarantee a sustainable bitrate and allow a peak bitrate for the MPU without a delay constraint over a shared channel such as file downloading.<br>100: The Available Bit Rate (ABR) class shall not guarantee any bitrate, but may report an available bitrate for feedback control. This class is appropriate for applications which can be adaptive to time-varying bitrate such as video streaming with RTCP feedback.<br>011: The Unspecified Bit Rate (UBR) class shall not guarantee any bitrate and shall not indicate congestion. This class is appropriate for interactive applications such as Web browsing. A UBR service is equivalent to the term "best effort service". |

TABLE 5-continued

| Element or Attribute Name | Description |
| --- | --- |
| hybrid_sync_indicator | Is for transmission synchronization between this MPU and another MPU.<br>1: no dependency.<br>0: dependent on the other MPU for synchronization in hybrid delivery. |
| sustainable_rate | The sustainable_rate defines the minimum bitrate that shall be guaranteed for continuous delivery of the MPU. The sustainable_rate corresponds to a drain rate in a token bucket model. The sustainable_rate is expressed in kilobits of MFU (or MPU) per second. |
| buffer_size | The buffer_size defines the maximum buffer size for delivery of the MPU. The buffer absorbs an excess instantaneous bitrate higher than the sustainable_rate and the buffer_size shall be large enough to avoid overflow. The buffer_size corresponds to bucket depth in a token bucket model. Buffer_size of a CBR MPU shall be zero. The buffer_size is expressed in kilobits. |
| peak_rate | The peak_rate defines a peak bitrate during continuous delivery of the MPU. The peak_rate is the highest average bit rate during every MFU period. The peak_rate is expressed in kilobits of MFU (or MPU) per second. |
| MFU_period | The MFU period defines minimum period of MFU during continuous delivery of the MPU. The MFU period is expressed in millisecond. |
| max_MFU_size | The max_MFU_size is the maximum size of MFU, which is MFU_period*peak_rate. The max_MFU_size is expressed in kilobits. |
| SubAsset_period | Temporal length of a sub-asset. The SubAssetPeriod is expressed in seconds. |

In Table 5, the SubAsset_delivery_characteristic_header_flag is an element indicating whether there is SubADC information. For example, the SubAsset_delivery_characteristic_header_flag may be implemented with 1 bit. If a value of the SubAsset_delivery_characteristic_header_flag is '1', the SubAsset_delivery_characteristic_header_flag indicates that there is the SubADC information.

In Table 5, the mpu_sequence_number, number_of_au, au_length, private_header_flag, private_header_length, loss_priority, delay_priority, class_of_service, hybrid_sync_indicator, sustainable_rate, buffer_size, peak_rate, MFU_period, max_MFU_size, and SubAsset_period are described above with reference to Table 3, so a detailed description thereof will be omitted below.

Delivery characteristics information on the MPU unit or the preset period unit of multimedia data, e.g., the MDC information and the SubADC information may be generated on a process for generating (capturing or grabbing) multimedia contents or a process for encapsulating pre-encoded multimedia data. A method for using the generated multimedia data delivery characteristics information will be described.

Meanwhile, the MMT system includes an MMT Encapsulation layer (E layer), an MMT Delivery layer (D layer), and an MMT Control layer (C layer). So, a method for transmitting/receiving multimedia data delivery characteristics information according to an embodiment of the present disclosure will be described by considering each of the MMT E layer, the MMT D layer, and the MMT C layer.

Firstly, a process for transmitting/receiving multimedia data delivery characteristics information according to an embodiment of the present disclosure will be described by considering an MMT E layer.

In an embodiment of the present disclosure, an MMT E layer determines whether the MMT E layer generates multimedia data delivery characteristics information on an MPU unit or a preset period unit basis, and generates delivery characteristics information on the MPU unit or the preset period unit of multimedia data.

Figure 3:
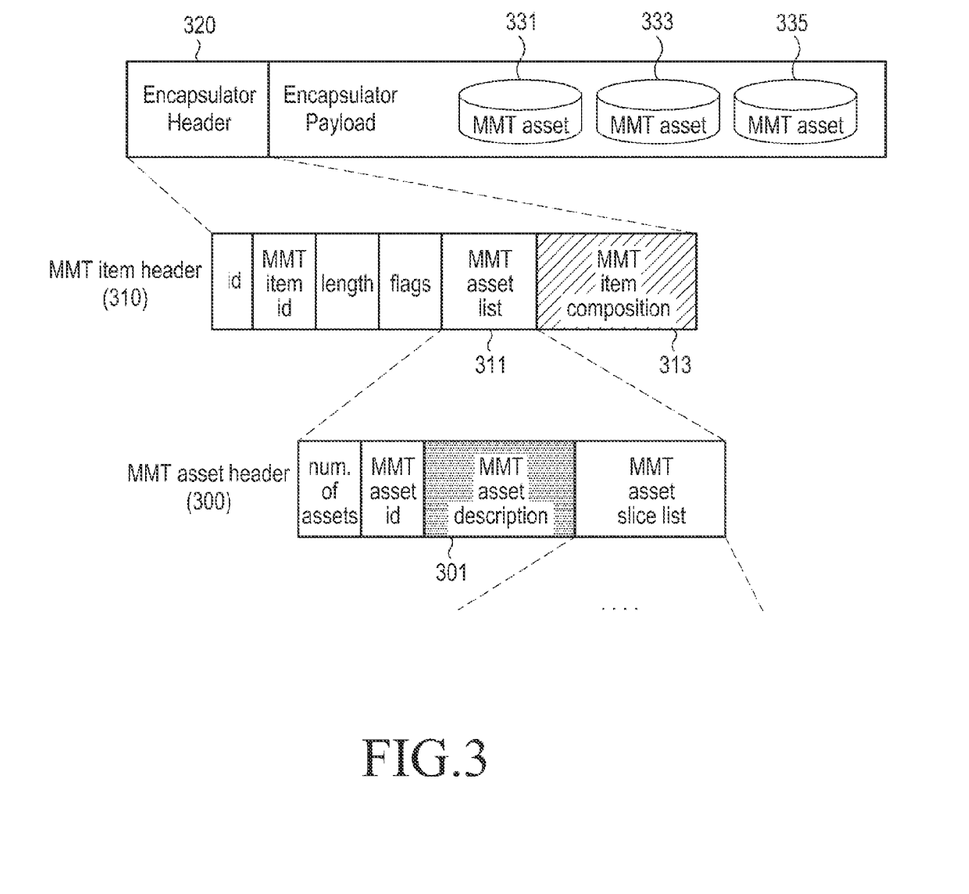
FIG. 3 schematically illustrates a structure of a Moving Picture Expert Group (MPEG) Media Transport (MMT) package processed in an MMT Encapsulation layer (E layer) in an MMT system according to an embodiment of the present disclosure.

FIG. 3 schematically illustrates a structure of an MMT package processed in an MMT E layer in an MMT system according to an embodiment of the present disclosure.

Referring to FIG. 3, the MMT package includes an encapsulator header field 320 and an encapsulator payload field. The encapsulator payload field includes MMT assets 331, 333, and 335. Each of the MMT assets 331, 333, and 335 denotes a separate component included in media contents, e.g., a video component or an audio component, so there is multimedia data delivery characteristics information per MMT asset. The multimedia data delivery characteristics information per MMT asset may be used for QoS management and a resource reservation for a related service using the RSVP in a process for establishing a service session for a related MMT asset. For one or more MPUs included in an MMT asset, delivery characteristics information on an MPU unit or a preset period of multimedia data proposed in an embodiment of the present disclosure is added into an MPU header as information on transmission and QoS management. The encapsulator header field 320 may include an MMT item header field 310. The MMT asset header field 300 includes an MMT asset description field 301.

The MMT item includes one or more MMT assets, so the MMT item header field 310 includes an MMT asset list field 311. Relation information indicating a relationship among MMT assets included in the MMT item, e.g., temporal, spatial presentation information is included in an MMT item composition field 313.

The MMT item header field 310 further includes an IDentifier (ID) field, an MMT item field, a length field, and a flags field, and the MMT asset header field 300 includes a num. of assets field, an MMT asset ID field, and an MMT asset slice list field. A detailed description of the ID field, the MMT item field, the length field, the flags field, the num. of assets field, the MMT asset ID field, and the MMT asset slice list field will be omitted herein.

The MMT asset list field 311 includes an MMT asset header field 300 that includes an MMT asset description field 301. Multimedia data delivery characteristics information on a single MMT asset, i.e., Asset Delivery Characteristics (ADC) information may be included in the MMT asset description field 301. If an MMT item includes the single MMT asset, multimedia data delivery characteristics information included in the MMT asset description field 301 included in the MMT asset header field 300 may be used.

Secondly, a process for transmitting/receiving multimedia data delivery characteristics information according to an embodiment of the present disclosure will be described by considering an MMT C layer.

The MMT C layer performs a function for exchanging service discovery information, Quality of Experience (QoE) management information and Digital Rights Management (DRM) information between an MMT server and an MMT client. During a process for exchanging the discovery information between the MMT server and the MMT client, a process for reserving a network resource may be performed in order to establish a service session, so the MMT C layer performs a QoS management operation such as a resource reservation using multimedia data delivery characteristics information included in an MMT asset. As described above, QoS management on an MMT asset basis is performed on multimedia contents basis, so, in a dynamic network environment, there is a need for a method of managing a QoS of an MPU unit as a unit which is less than the MMT asset or a preset period of multimedia data according to an embodiment of the present disclosure.

Thirdly, a process for transmitting/receiving multimedia data delivery characteristics information according to an embodiment of the present disclosure will be described by considering an MMT D layer.

The MMT D layer performs a function for transmitting an encapsulated multimedia packet from the MMT server to the MMT client and a function for exchanging information among layers (for example, an interface among layers) within a terminal The terminal may be one of all transmission terminals which have a function for transmitting MMT data or transmitting the MMT data after receiving the MMT data such as nodes which are on a network as well as the MMT server and the MMT client. Upon transmitting a feedback signal to the MMT server, the MMT client may transmit the feedback signal to the MMT server through the MMT D layer. The nodes include nodes which have a function for transmitting related MMT data after performing a specific function. So, the MMT D layer generates a delivery packet. The MMT D layer acquires QoS associated information which should be included into each delivery packet from an MPU header in order to guarantee a QoS of each delivery packet.

Figure 4:
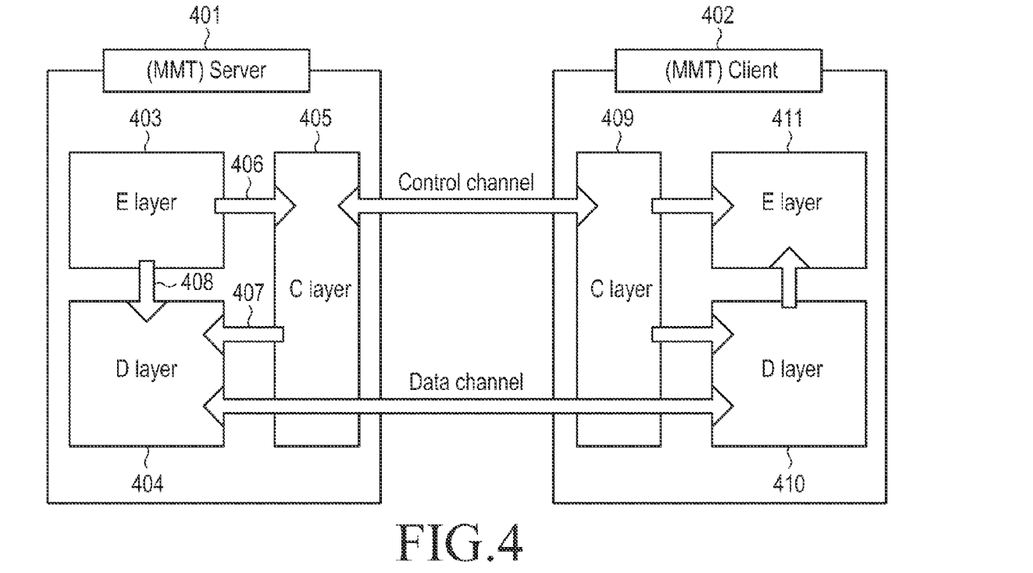
FIG. 4 schematically describes a process for using multimedia data delivery characteristics information in a media transmission service process in an MMT system according to an embodiment of the present disclosure.

FIG. 4 schematically describes a process for using multimedia data delivery characteristics information in a media transmission service process in an MMT system according to an embodiment of the present disclosure.

Referring to FIG. 4, the MMT system includes an MMT server 401 and an MMT client 402. The MMT server 401 includes an MMT E layer 403, an MMT D layer 404, and an MMT C layer 405. The MMT client 402 includes an MMT C layer 409, an MMT D layer 410, and an MMT E layer 411. The MMT C layer 405 and the MMT C layer 409 communicate through a control channel. The MMT D layer 404 and the MMT D layer 410 communicate through a data channel.

Delivery characteristics information on an MPU unit or a preset period unit of multimedia data according to an embodiment of the present disclosure, e.g., MDC information or SubADC information, is generated in the MMT E layer 403, and the generated multimedia data delivery characteristics information is included in an MPU header. For example, delivery characteristics information on an MPU unit of multimedia data according to an embodiment of the present disclosure is classified into information used for resource reservation, e.g., a double leaky parameter or a Bitstream_descriptor among the MDC information included in the MPU header, and information which differentiates a relative priority per a transmission packet by being included in each transmission packet, e.g., a QoS_descriptor among the MDC information included in the MPU header.

The Bitstream_descriptor generated in the MMT E layer 403 is delivered to the MMT C layer 405 (406), the MMT C layer 405 delivers the Bitstream_descriptor delivered from the MMT E layer 403 to the MMT C layer 409 using signaling through a control channel, and a protocol (for example, a Real-Time Stream Protocol (RTSP), a Session Initiation Protocol (SIP), etc.).

The QoS_descriptor generated in the MMT E layer 403 is delivered to the MMT D layer 404 (407), the MMT D layer 404 may insert the QoS_descriptor delivered from the MMT E layer 403 into each transmission packet, deliver each transmission packet into which the QoS_descriptor is inserted to the MMT client 402 and an intermediate network device through a data channel, acquire the QoS_descriptor by accessing an encapsulation header field 320 described in FIG. 3 and parsing the encapsulation header field 320, and transmit the acquired QoS_descriptor. This process is performed on an MPU unit or a preset period unit basis, so this process may be performed within a relatively short time compared with a process which is performed on an MMT asset basis in a related-art MMT system.

Figure 5:
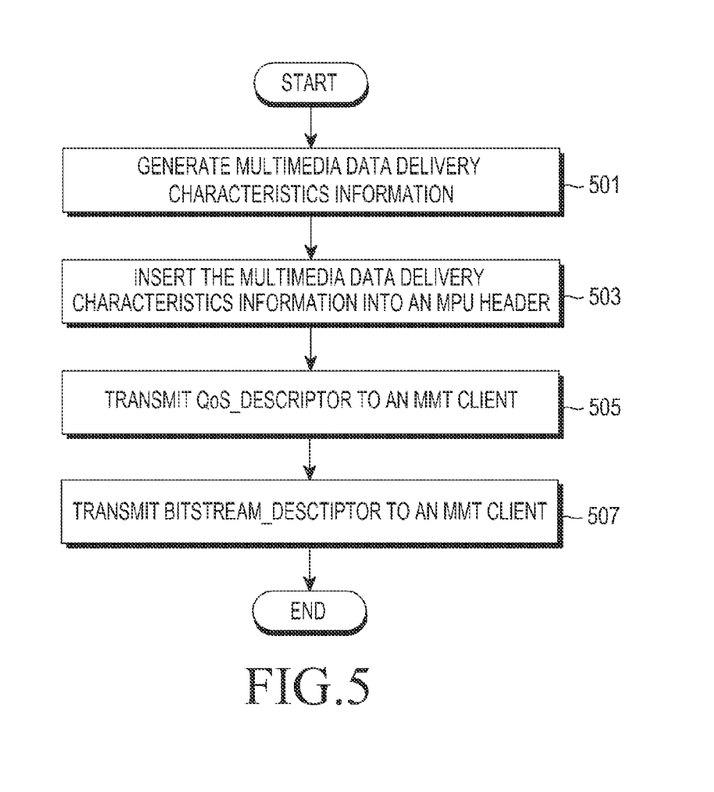
FIG. 5 schematically illustrates a processor for generating/transmitting delivery characteristics information on a Media Processing Unit (MPU) unit or a preset period unit of multimedia data by an MMT server in an MMT system according to an embodiment of the present disclosure.

FIG. 5 schematically illustrates a processor for generating/transmitting delivery characteristics information on an MPU unit or a preset period unit of multimedia data by an MMT server in an MMT system according to an embodiment of the present disclosure.

Referring to FIG. 5, the MMT server generates multimedia data delivery characteristics information including a QoS_descriptor which is generated on an MPU basis and indicates a relative priority per transmission packet and a Bitstream_desctiptor indicating information used for resource reservation in operation 501. The QoS_descriptor and the Bitstream_desctiptor are described above with reference to Tables 2 and 4, so a detailed description will be omitted below.

The MMT server inserts the generated multimedia data delivery characteristics information, e.g., MDC information into an MPU header in operation 503. The operation of generating the multimedia data delivery characteristics information, inserting the multimedia data delivery characteristics information into the MPU header, and delivering the MPU header into which the multimedia data delivery characteristics information is inserted may be performed in an MMT E layer 403 descried in FIG. 4. The MPU header into which the multimedia data delivery characteristics information is inserted may be delivered from the MMT E layer 403 to each of an MMT C layer 405 and an MMT D layer 404 descried in FIG. 4.

The MMT server acquires a QoS_descriptor from the MPU header into which the multimedia data delivery characteristics information is inserted, and transmits the acquired QoS_descriptor to an MMT client in operation 505.

The MMT server acquires a Bitstream_desctiptor from the MPU header into which the multimedia data delivery characteristics information is inserted, and transmits the acquired Bitstream_desctiptor to the MMT client in operation 507. That is, the MMT server manages a QoS of a related multimedia service by transmitting the QoS_descriptor, and reserves a resource for the related multimedia service by transmitting the Bitstream_desctiptor. In FIG. 5, the MMT server performs operation 507 after performing operation 505, however it will be understood by those of ordinary skill in the art that the MMT server may perform operations 505 and 507 at the same time or the MMT server may perform operation 505 after performing operation 507.

In FIGS. 4 and 5, a process for transmitting/receiving multimedia data delivery characteristics information, e.g., MDC information or SubADC information by considering inner layers included in an MMT server and an MMT client has been described.

However it will be understood by those of ordinary skill in the art that the multimedia data delivery characteristics information, e.g., the MDC information or the SubADC information does not have to be transmitted/received by considering the inner layers included in the MMT server and the MMT client, a detailed description thereof is provided below.

A description of the MMT server is provided below.

The MMT server includes a transmitter, a receiver, a controller, and a storage unit, or includes a single unit into which the transmitter, the receiver, the controller, and the storage unit are incorporated.

The controller controls the overall operation of the MMT server. In particular, the controller controls the MMT server to perform an operation corresponding to a method for transmitting multimedia data delivery characteristics information. The operation corresponding to the method for transmitting the multimedia data delivery characteristics information is performed in the manner described before with reference to FIGS. 3 to 5 and Tables 2 to 5, so a detailed description thereof will be omitted herein.

The transmitter transmits various messages related to the operation corresponding to the method for transmitting the multimedia data delivery characteristics information to the MMT client under the control of the controller.

The receiver receives various messages related to the operation corresponding to the method for transmitting multimedia data delivery characteristics information from the MMT client under the control of the controller.

The storage unit stores various programs and data related to the MMT server, data related to the operation corresponding to the method for the transmitting multimedia data delivery characteristics information, and messages received in the receiver.

A description of the MMT client is provided below.

The MMT client includes a transmitter, a receiver, a controller, and a storage unit, or includes a single unit into which the transmitter, the receiver, the controller, and the storage unit are incorporated.

The controller controls the overall operation of the MMT client. In particular, the controller controls the MMT client to perform an operation corresponding to a method for receiving multimedia data delivery characteristics information. The operation corresponding to the method for receiving the multimedia data delivery characteristics information is performed in the manner described above with reference to FIGS. 3 to 5 and Tables 2 to 5, so a detailed description thereof will be omitted below.

The transmitter transmits various messages related to the operation corresponding to the method for receiving the multimedia data delivery characteristics information to the MMT server under the control of the controller.

The receiver receives various messages related to the operation corresponding to the method for receiving the multimedia data delivery characteristics information from the MMT client under the control of the controller.

The storage unit stores various programs and data related to the MMT client, data related to the operation corresponding to the method for the receiving multimedia data delivery characteristics information, and messages received in the receiver.

That is, for convenience in explanation, in an MMT system according to an embodiment of the present disclosure, the MMT server becomes a multimedia data transmission apparatus and the MMT client becomes a multimedia data reception apparatus.

It is noted that operations or signal flows in FIGS. 4 to 5 are not used to limit the scope of the present disclosure. That is, it is noted that the operations or signal flows in FIGS. 4 to 5 are only examples for explanation, so the operations or signal flows may be implemented even though the signal flows do not include all of the processes, and the operations or signal flows may be implemented within any layer.

The described operations may be implemented by equipping a memory device which stores a related program code into an arbitrary component included in an MMT server or an MMT client. That is, an MMT E layer, an MMT C layer, and an MMT D layer included in the MMT server or the MMT client may perform the described operations by reading the program code stored in the memory device using a processor or a Central Processing Unit (CPU).

It will be understood that an apparatus and method for transmitting/receiving multimedia data delivery characteristics information may be implemented as one of a hardware, a software, or a combination of the hardware and the software. For example, the software may be stored in one of a volatile memory and non-volatile memory such as a Read Only Memory (ROM), a memory such as a Random Access Memory (RAM), a memory chip, a memory device, an integrated circuit, and a storage in which optical or magnetic writing is possible and is readable by a machine (e.g., a computer) such as a Compact Disk (CD), a Digital Versatile Disc (DVD), a magnetic disk, a magnetic tape regardless of whether the software is erasable or rewritable. A method for transmitting/receiving multimedia data delivery characteristics information according to an embodiment of the present disclosure may be implemented by a computer or a portable terminal including a controller and a memory. For example, the memory may be a non-transitory machine-readable storage which is appropriate for storing a program(s) including instructions used for implementing embodiments of the present disclosure.

So, an embodiment of the present disclosure includes a program including codes used for implementing an apparatus or a method claimed in an arbitrary claim and a non-transitory machine-readable storage which stores the program. The program may be electrically transmitted through an arbitrary medium such as a communication signal which is transmitted through a wire or wireless communication. An embodiment of the present disclosure may include other medium equivalent to the arbitrary medium.

An apparatus for transmitting/receiving multimedia data delivery characteristics information according to an embodiment of the present disclosure may receive the program from a program provider which is connected to the apparatus through a wired or wireless connection and store the program.

As is apparent from the foregoing description, an embodiment of the present disclosure enables to effectively reserve a resource and manage a QoS of a multimedia service in a case that a transmission environment dynamically changes such as a mobile network by generating/transmitting delivery characteristics information on multimedia data on relatively small time or a preset period basis.

An embodiment of the present disclosure enables to dynamically reserve a resource according to characteristics for dynamic multimedia data.

An embodiment of the present disclosure enables to share a resource which occurs and is not used if a resource that is required through the dynamic resource reservation is smaller than a resource that is reserved and guaranteed at a service session start timing point. So, an embodiment of the present disclosure enables to effectively use a limited transmission resource.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting delivery characteristics information by a transmission apparatus in a multimedia system, the method comprising:

identifying a media processing unit (MPU) included in an asset, wherein the MPU comprises an information part including information for the MPU, the information part including flag information indicating whether the MPU includes delivery characteristics information or not and sequence number information indicating a sequence number of the MPU; and transmitting a message comprising the delivery characteristics information, wherein the delivery characteristics information is related to a quality of service (QoS) for the asset and includes an element indicating a required loss tolerance for the asset for delivery and an element for classifying services, wherein the element for classifying services indicates at least one of a constant bit rate (CBR) service class to guarantee a peak bit rate at any time to be dedicated for transmitting the asset, and a variable bit rate (VBR) service class to guarantee a sustainable bit rate and allow a peak bit rate for the asset with delay constraints over a shared channel, wherein the asset includes one or more MPUs that share an asset identifier (ID), wherein the MPU is identified by the asset ID and the sequence number, and wherein the sequence number of the MPU is unique within the asset.

2. The method of claim 1, wherein the element indicating the required loss tolerance for the asset for delivery indicates that the asset requires lossless delivery or that the asset allows lossy delivery.

3. The method of claim 1, wherein the delivery characteristics information further includes an element indicating a required level of delay sensitivity for the asset that indicates that a high delay sensitivity for the asset requires a delay time to be shorter than a first delay time, a medium delay sensitivity for the asset requires the delay time to be shorter than a second delay time that is greater than the first delay time, and a low delay sensitivity for the asset indicates the delay time may be greater than or equal to the second delay time.

* * * * *